(12) United States Patent
Inotsume (10) Patent No.: US 11,913,789 B2
(45) Date of Patent: Feb. 27, 2024

(54) INSPECTION MANAGEMENT DEVICE, INSPECTION MANAGEMENT METHOD, AND RECORDING MEDIUM TO STORE PROGRAM

(71) Applicant: NEC Corporation, Tokyo (JP)

(72) Inventor: Hiroaki Inotsume, Tokyo (JP)

(73) Assignee: NEC CORPORATION, Tokyo (JP)

( * ) Notice: Subject to any disclaimer, the term of this patent is extended or adjusted under 35 U.S.C. 154(b) by 748 days.

(21) Appl. No.: 16/981,513

(22) PCT Filed: Mar. 23, 2018

(86) PCT No.: PCT/JP2018/011593
§ 371 (c)(1),
(2) Date: Sep. 16, 2020

(87) PCT Pub. No.: WO2019/180897
PCT Pub. Date: Sep. 26, 2019

(65) Prior Publication Data
US 2021/0116248 A1    Apr. 22, 2021

(51) Int. Cl.
*G01C 21/20* (2006.01)
*B64C 39/02* (2023.01)
(Continued)

(52) U.S. Cl.
CPC ............ *G01C 21/20* (2013.01); *B64C 39/024* (2013.01); *G01N 21/8803* (2013.01);
(Continued)

(58) Field of Classification Search
CPC .. G01C 21/20; B64C 39/024; G01N 21/8803; G01N 21/8851; G01N 21/9515;
(Continued)

(56) References Cited

U.S. PATENT DOCUMENTS

2017/0192418 A1* 7/2017 Bethke ................ G08G 5/0013

FOREIGN PATENT DOCUMENTS

JP    S58-201047 A    11/1983
JP    S60-198610 A    10/1985
(Continued)

OTHER PUBLICATIONS

International Search Report for PCT Application No. PCT/JP2018/011593, dated Jun. 19, 2018.
English translation of Written opinion for PCT Application No. PCT/JP2018/011593, dated Jun. 19, 2018.

*Primary Examiner* — Brian P Sweeney (57) ABSTRACT

Provided is an inspection management device and the like capable of reducing, by an inspection robot, the number of pieces of measurement data indicating measurement failure. The inspection management device includes: a data analysis unit that determines success or failure in measurement at a measurement position of a structure based on measurement data output from an inspection robot that inspects the structure in accordance with an inspection plan, the measurement data being output each time when the inspection robot performs measurement, and estimates a cause of measurement failure in accordance with a determination result; and an inspection planning unit that corrects the inspection plan based on the estimated cause and outputs the corrected inspection plan.

6 Claims, 10 Drawing Sheets

(51) Int. Cl.
  *G01N 21/88* (2006.01)
  *G06N 20/00* (2019.01)
  *G05D 1/10* (2006.01)
  *G05D 1/00* (2006.01)
  *B64U 101/30* (2023.01)

(52) U.S. Cl.
  CPC ......... *G01N 21/8851* (2013.01); *G05D 1/101*
     (2013.01); *G06N 20/00* (2019.01); *B64U*
     *2101/30* (2023.01)

(58) Field of Classification Search
  CPC ... G01N 2021/8867; G01N 2021/9518; G01N
     29/04; G05D 1/101; G05D 1/102; G06N
     20/00; B64U 2101/30; E01D 22/00;
     G01D 21/00; G01M 99/00
  See application file for complete search history.

(56) References Cited

FOREIGN PATENT DOCUMENTS

| | | |
|---|---|---|
| JP | H03-194463 A | 8/1991 |
| JP | H04-367656 A | 12/1992 |
| JP | H07-063736 A | 3/1995 |
| JP | H11-63988 A | 3/1999 |
| JP | 2008-111780 A | 5/2008 |
| JP | 2011-214845 A | 10/2011 |
| JP | 5911645 B1 | 4/2016 |
| JP | 2016-178769 A | 10/2016 |
| JP | 2016-225863 A | 12/2016 |
| WO | 2013/105164 A1 | 7/2013 |

* cited by examiner

INSPECTION MANAGEMENT DEVICE, INSPECTION MANAGEMENT METHOD, AND RECORDING MEDIUM TO STORE PROGRAM

This application is a National Stage Entry of PCT/JP2018/011593 filed on Mar. 23, 2018, the contents of all of which are incorporated herein by reference, in their entirety.

TECHNICAL FIELD

The present invention relates to inspection management of a structure by an inspection robot mounted with an inspection device.

BACKGROUND ART

Of 700,000 bridges built in Japan, bridges built equal to or more than 50 years ago will account for 53% in the 2030's. On the other hand, the number of skilled workers who inspect these infrastructures is predicted to decrease. As a result, it is concerned that there will be a shortage of workers skilled in infrastructure inspections in the future, and more efficient inspections are required to make up for this shortage. In current infrastructure inspections, there is also a problem of variations in inspection accuracy or inefficiency due to manual work in each stage of inspection, recording, preparation of records, and creation of database.

To solve these problems, it is desired to eliminate dependency on individual skills by automation of inspection work, and to automate the whole process from inspection to preparation of records. To enable such automation and improvement of efficiency from inspection to preparation of records, it is considered to perform measurement using a mobile robot mounted with a measuring machine, automatic detection of damaged parts by a calculator, and automatic preparation of records. By using such an inspection robot and a calculator, it is expected that measurement data with small variations and inspection results based on the measurement data can be acquired.

For example, PTL 1 discloses that an inspection robot sequentially moves to a plurality of measurement positions set in advance for a structure to be inspected and performs measurement. It is also disclosed that a calculator plans a moving route for the inspection robot and analyzes measurement data including an image to determine whether there is an abnormality in the structure.

On the other hand, for correct determination, it is necessary to measure appropriate measurement data. Thus, various techniques have been proposed to reduce defects in measurement data.

For example, PTL 2 proposes a technique of changing the number of images acquired per moving amount of an airframe in advance in accordance with an amount and a direction of an air flow around the structure.

PTL 5 discloses a device that improves reliability of measurement data by using a calibration block to eliminate a backward step of conducting an investigation when data cannot be measured correctly for some causes.

CITATION LIST

Patent Literature

[PTL 1] JP 2016-178769 A
[PTL 2] JP 2016-225863 A
[PTL 3] JP 11-63988 A
[PTL 4] JP 5911645 B1
[PTL 5] JP 2008-111780 A

SUMMARY OF INVENTION

Technical Problem

In PTLs 1 to 5, the measurement data acquired by the inspection robot is trusted, and damage to the structure is determined on the basis of the measurement data. In practice, however, measurement data indicating measurement failure occurs. When any defects are found by analyzing the measurement data brought back, it is necessary to perform measurement again at an inspection site. Accordingly, efficiency of inspection work is not improved, and an inspection cost is increased.

An object of the present invention is to provide an inspection management device and the like capable of reducing, by an inspection robot, the number of pieces of measurement data indicating measurement failure.

Solution to Problem

An aspect of an inspection management device of the present invention includes: a data analysis unit that acquires measurement data from an inspection robot that inspects a structure in accordance with an inspection plan including a measurement plan and an inspection route, the measurement data being acquired each time when the inspection robot performs measurement, and determines success or failure in the measurement based on the measurement data; and an inspection planning unit that corrects the inspection plan in accordance with a determination result of success or failure in the measurement and outputs the corrected inspection plan.

An aspect of an inspection management method of the present invention includes: determining success or failure in measurement at a measurement position based on measurement data output from an inspection robot that measures the measurement position included in an inspection plan, the measurement data being output each time when the inspection robot performs measurement; estimating a cause of measurement failure in accordance with a determination result; and correcting the inspection plan based on the estimated cause and outputting the corrected inspection plan.

An aspect of a program stored in a recording medium of the present invention causes a computer to execute: determining success or failure in measurement at a measurement position based on measurement data output from an inspection robot that measures the measurement position included in an inspection plan, the measurement data being output each time when the inspection robot performs measurement; estimating a cause of measurement failure in accordance with a determination result; and correcting the inspection plan based on the estimated cause and outputting the corrected inspection plan.

Advantageous Effects of Invention

The present invention can reduce, by an inspection robot, the number of pieces of measurement data indicating measurement failure.

EXAMPLE EMBODIMENT

First Example Embodiment

Figure 1:
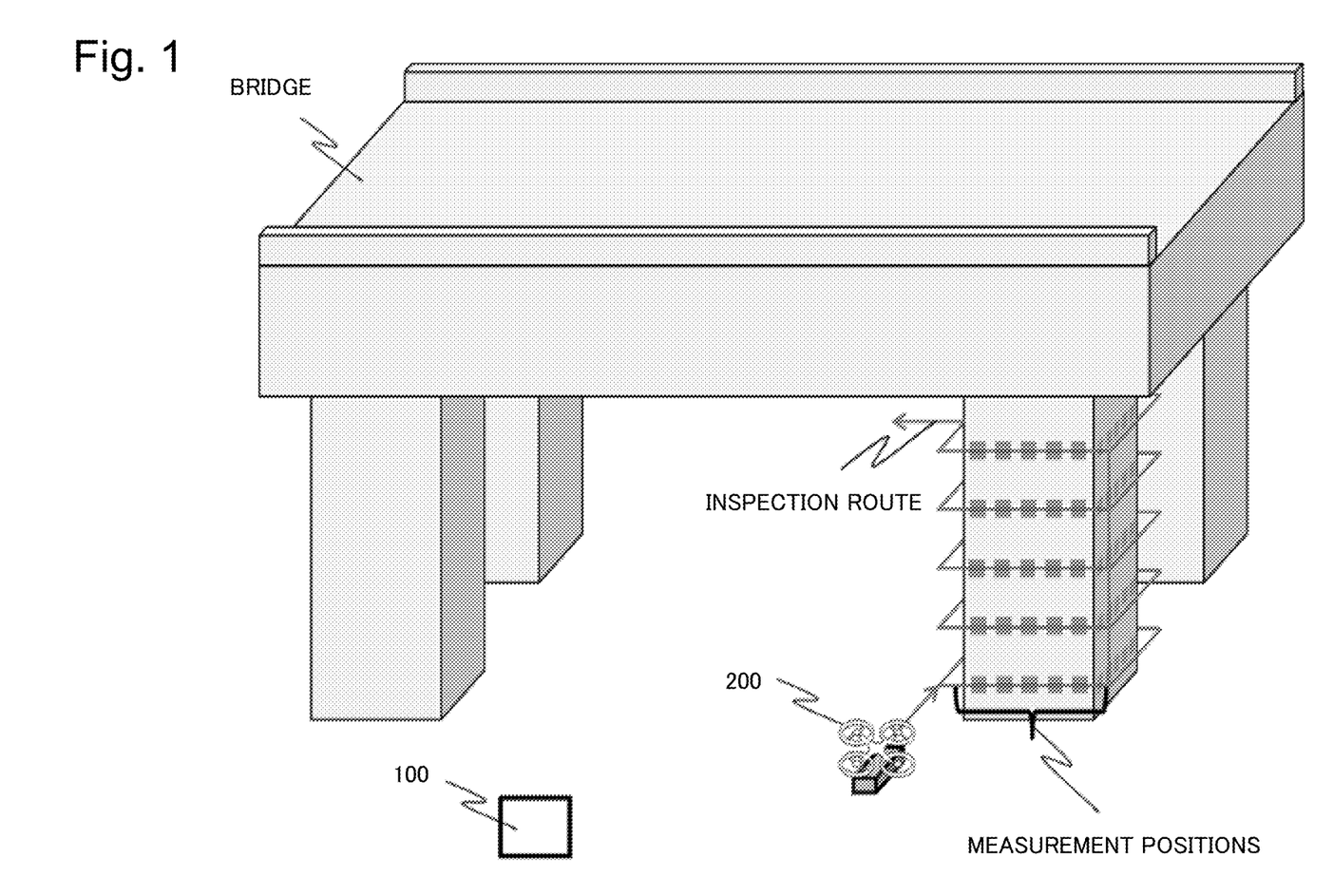
FIG. 1 is a diagram illustrating an outline of inspection work of a structure by an inspection robot.

Inspection of a structure using an inspection management system including an inspection management device and an inspection robot according to a first example embodiment will be described with reference to the drawings. In an example of the first example embodiment, a bridge is a structure to be inspected. FIG. 1 is a diagram illustrating an inspection route on the bridge by an inspection robot 200. In one bridge pier, the inspection robot 200 moves to measurement positions at the same height on stages set on a wall surface and sequentially performs measurement. FIG. 1 is an example in which measurement positions are set on the lowermost first stage to the uppermost fifth stage in the inspection route.

The inspection robot 200 is a mobile robot including an inspection device. The mobile robot includes an aerial mobile body, a ground mobile body, a water mobile body, or an underwater mobile body. The inspection device of the inspection robot 200 includes a sensor for inspection of the bridge, and outputs measurement data measured by the sensor.

An example of the inspection device is a hammering inspection machine. In a hammering inspection, hammering data obtained by hammering the wall surface of the object to be inspected is acquired by the hammering inspection machine, and the hammering data is analyzed by an inspection management device 100 to determine whether there is an abnormality inside the bridge. The measurement positions of FIG. 1 are positions where the inspection robot 200 measures hammering sound on the wall surface of the bridge.

Figure 2:
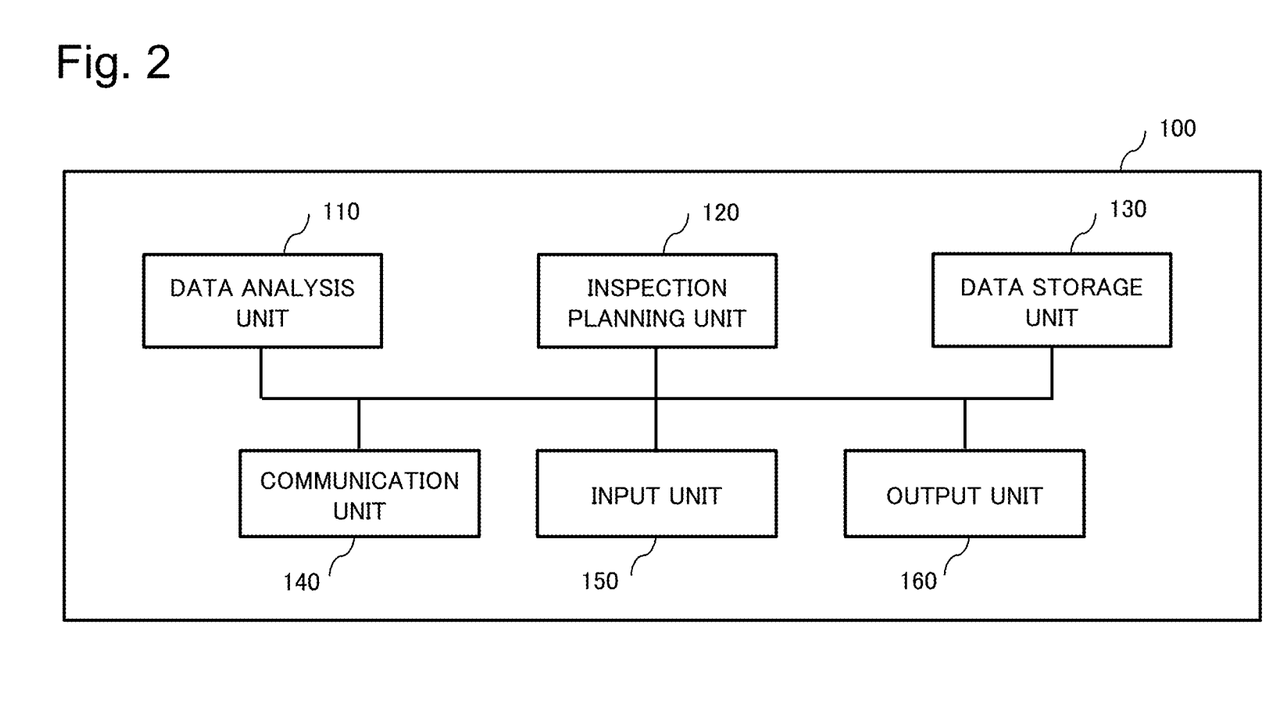
FIG. 2 is a block diagram illustrating an example of a configuration of an inspection management device according to a first example embodiment.

The inspection management device according to the first example embodiment will be described with reference to the drawings. FIG. 2 is a block diagram illustrating a configuration of the inspection management device 100 according to the first example embodiment. As illustrated in FIG. 2, the inspection management device 100 includes a data analysis unit 110, an inspection planning unit 120, a data storage unit 130, a communication unit 140, an input unit 150, and an output unit 160.

The inspection management device 100 generates an inspection plan for the structure and transmits the inspection plan to the inspection robot 200. The inspection management device 100 analyzes measurement data from the inspection robot 200 to determine success or failure in measurement, and generates an inspection plan again in accordance with a determination result.

The data analysis unit 110 analyzes measurement data output from the inspection robot 200 to determine success or failure in measurement. When determining that the measurement has failed, the data analysis unit 110 estimates a cause of the measurement failure.

The inspection planning unit 120 generates a measurement plan and a route plan for the inspection robot 200. The measurement plan includes measurement positions of the structure, and the route plan includes an inspection route for the inspection robot 200 to sequentially move to the measurement positions of the structure and perform measurement. When the data analysis unit 110 determines that the measurement has failed, the inspection planning unit 120 corrects at least one of the measurement plan or the route plan in the inspection plan.

The data storage unit 130 temporarily holds acquired measurement data. The communication unit 140 receives measurement data from the inspection robot 200 or transmits an inspection plan to the inspection robot 200. The input unit 150 receives an input or setting of an advance inspection plan, measurement parameters of a device, an inspection command, and the like by an inspection worker. The output unit 160 outputs, to an inspection worker, a 3D model of the bridge, or a state of inspection work, such as a status of execution of the inspection, and a position, a speed, or a remaining battery level of the inspection robot 200.

Figure 3:
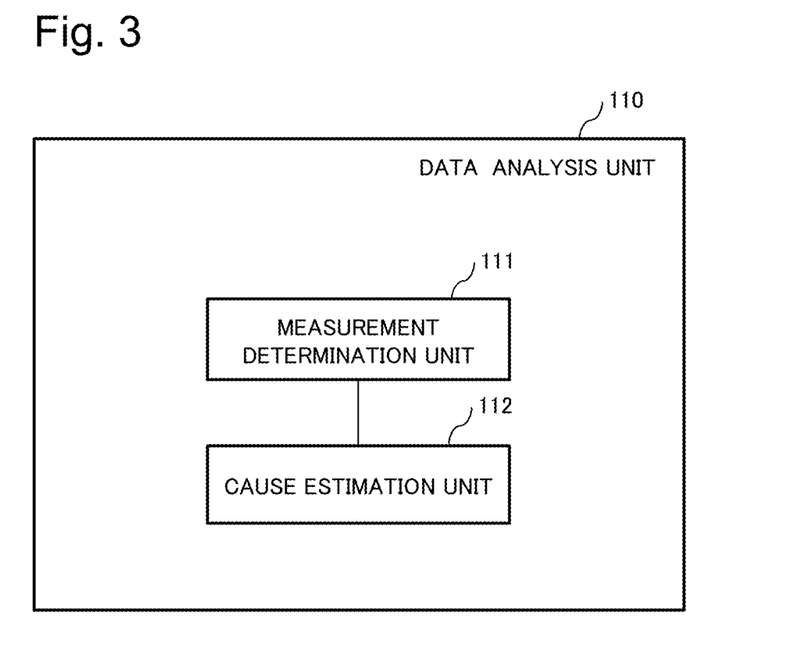
FIG. 3 is a block diagram illustrating an example of a configuration of a data analysis unit of the inspection management device.

Hereinafter, the data analysis unit 110 and the inspection planning unit 120 of the inspection management device 100 will be described in detail. FIG. 3 is a block diagram illustrating an example of a configuration of the data analysis unit 110. The data analysis unit 110 illustrated in FIG. 3 includes a measurement determination unit 111 and a cause estimation unit 112.

The measurement determination unit 111 acquires measurement data output from the inspection robot 200, the measurement data being output each time when the inspection robot 200 performs measurement, and generates reliability of the acquired measurement data. The measurement determination unit 111 determines whether the measurement has succeeded or failed on the basis of the reliability of the measurement data.

The measurement determination unit 111 models the reliability of the measurement data at the time of a hammering inspection of the bridge, for example by using, as learning data, a combination of past measurement data, a determination result of the past measurement data, and presence or absence of an abnormal portion in the bridge based on the measurement data. As a model of the reliability, a two-class classification model of determination results of the measurement data can be applied.

Figure 4:
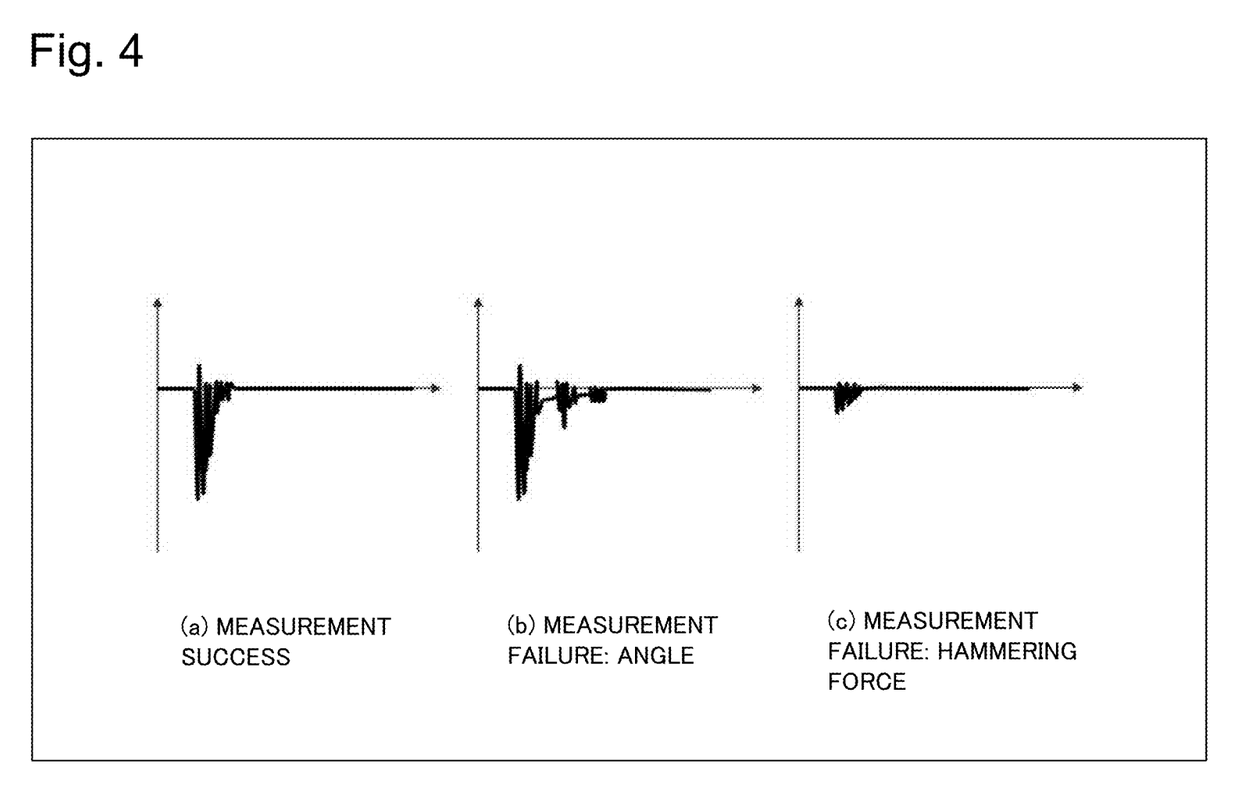
FIG. 4 is a diagram illustrating examples of measurement data of a hammering inspection.

FIG. 4 is a diagram illustrating examples of measurement data of a hammering inspection and determination results indicated by the measurement data. The data (a), (b), and (c) in FIG. 4 all represent time transition of an amplitude of hammering sound. The vertical axis of each graph represents the amplitude of the hammering sound, and the horizontal axis represents time. The data of (a) measurement success in FIG. 4 is an example in which measurement succeeded. The data of (b) measurement failure: angle in FIG. 4 is an example in which a hammer did not hit the wall surface perpendicularly and measurement failed. The data of (c) measurement failure: hammering force in FIG. 4 is an example in which a force of the hammer hammering the wall surface was weak and measurement failed.

When a model indicating a relationship between measurement data and success or failure in measurement is prepared, a moving speed of the inspection robot 200 at the time of the measurement or presence or absence of influence of an air flow on the inspection robot 200 at the time of the measurement may be included. For example, by providing the inspection robot 200 with an anemometer, the presence or absence of the influence of an air flow can be determined on the basis of data on a speed of the air flow.

The measurement determination unit 111 determines success or failure in the measurement on the basis of a model based on learning data held in the data storage unit 130 and newly acquired measurement data. The measurement determination unit 111 determines that the measurement has succeeded when the reliability of the acquired measurement data is equal to or more than a predetermined threshold value, and determines that the measurement has failed when the reliability is less than the threshold value.

The measurement data of the hammering inspection used as the learning data is not limited to the past measurement data of the structure to be inspected. For example, measurement data of a structure similar to the object to be inspected or measurement data of a test member equivalent to the object to be inspected may be used.

When a determination result of the measurement determination unit 111 indicates measurement failure, the cause estimation unit 112 estimates a factor to be a cause of the measurement failure. The cause estimation unit 112 uses the estimated cause of the measurement failure for parameter correction when an inspection plan to be corrected by a measurement planning unit is corrected. For example, when an amplitude of a sound wave of hammering data is small, it is estimated that the cause is a contact failure between the hammering inspection machine and the wall surface of the structure. Otherwise, it is estimated that the cause is a small hammering force of the hammer of the hammering inspection machine or a slow speed of the hammer. Alternatively, when vibration of the inspection robot 200 and a speed of an air flow are large, it is estimated that the vibration of the inspection robot 200 becomes large during the hammering inspection due to influence of the air flow. The cause estimation unit 112 may output a plurality of factors as the cause of the measurement failure.

The cause estimation unit 112 clusters data sets and causes of the measurement failure into a plurality of clusters. The data sets includes past measurement data and reliability of the past measurement data, a measurement environment (speed of an air flow, attitude of the inspection robot 200, attitude of the hammering inspection machine, and the like), and measurement parameters to be described later. The cause estimation unit 112 may estimate the cause of the failure from a cluster that applies to the newly acquired measurement data. For the clustering, a support vector machine (SVM) or a nearest neighbor method can be used.

Figure 5:
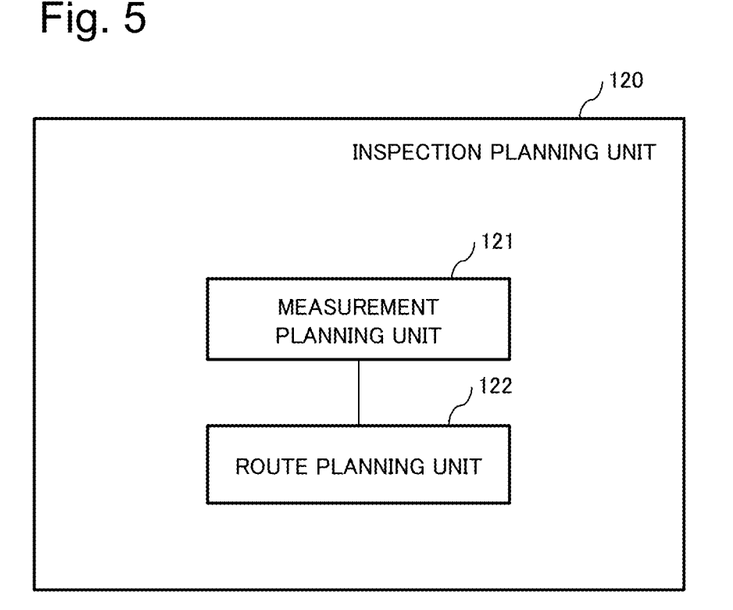
FIG. 5 is a block diagram illustrating an example of a configuration of an inspection planning unit of the inspection management device.

FIG. 5 is a block diagram illustrating an example of a configuration of the inspection planning unit 120. The inspection planning unit 120 includes a measurement planning unit 121 and a route planning unit 122. The measurement planning unit 121 determines, as information indicating the first measurement plan, measurement positions of the structure, the number of times of measurement, a hammering force of the hammer or a speed of the hammer of the hammering inspection machine, and an allowable value of position control of the inspection robot 200. The allowable value of the position control is, for example, a difference between the position of the inspection robot 200 during hovering and the measurement position.

The measurement positions of the structure at the start of the inspection are calculated on the basis of an interval between measurement positions set in advance and a three-dimensional structural diagram of the structure. The number of times of measurement at one measurement position and the allowable value of position accuracy may be set in advance. The hammering strength of the hammer may be changed in accordance with a material of the structure to be inspected.

The inspection planning unit 120 corrects a measurement plan and an inspection route as necessary on the basis of an estimation result of the cause estimation unit 112. The measurement plan includes, as measurement parameters, measurement conditions such as measurement positions of the bridge, intervals between the measurement positions, the number of times of measurement, and a hammering strength/speed, and an attitude angle of an inspection drone 200.

When the measurement fails at the time of execution of the inspection, the inspection planning unit 120 corrects the measurement parameters in accordance with a cause estimated by the cause estimation unit 112. For example, when the estimated cause is a contact failure between the hammering inspection machine and the wall surface of the bridge, the speed of the hammer of the hammering inspection machine is increased or the range of the allowable value of the position accuracy during hovering is narrowed to improve the contact failure. The correction of the measurement parameters may be corrected based on a plurality of causes.

When determining that there is an abnormality in the bridge based on the measurement data, the measurement determination unit 111 corrects the measurement positions and the number of times of measurement in such a way that the periphery of a measurement position where the abnormality is detected is measured again a plurality of times. At this time, the measurement parameters such as the hammering strength and the attitude angle of the inspection robot 200 are not changed.

The route planning unit 122 generates an inspection route for sequentially moving the inspection robot 200 to predetermined measurement positions determined by the measurement planning unit 121. In the inspection route illustrated in FIG. 1, among the measurement positions set on the bridge pier, measurement positions arranged in the horizontal direction are set as one loop, and the inspection robot 200 sequentially moves to the measurement positions in the loop. When finishing measurement in a loop of the lowermost first stage, the inspection robot 200 moves to a loop of the second stage, and sequentially moves to measurement positions in the loop of the second stage. When finishing the measurement of measurement positions in a loop of the uppermost fifth stage, the inspection robot 200 disengages from the bridge pier.

The inspection route not only includes data merely indicating passing positions, but may also be generated as orbit data in which measurement positions among the passing positions are associated with an attitude, a flight speed, acceleration, and the like of the inspection robot 200 at the planned position. For example, when an obstacle exists between a measurement position A and a measurement position B, the route planning unit 122 may generate an inspection route that avoids the obstacle. For example, the route planning unit 122 detects the position of an obstacle appeared in a planned inspection route by self localization by a wide-angle stereo camera and a three-dimensional map of the inspection route, and generates an inspection route that avoids the obstacle. When detecting that the inspection robot 200 largely deviates from a planned inspection route due to influence of an air flow or the like, the route planning unit 122 may newly generate an inspection route to the next measurement position. The route planning unit 122 detects the deviation of the inspection robot 200 by, for example, a position change of the inspection robot 200 by GPS positioning. Alternatively, the position change of the inspection robot 200 may be detected on the basis of acceleration and an angular velocity output from an acceleration sensor and a gyroscope provided in the inspection robot 200.

Figure 6:
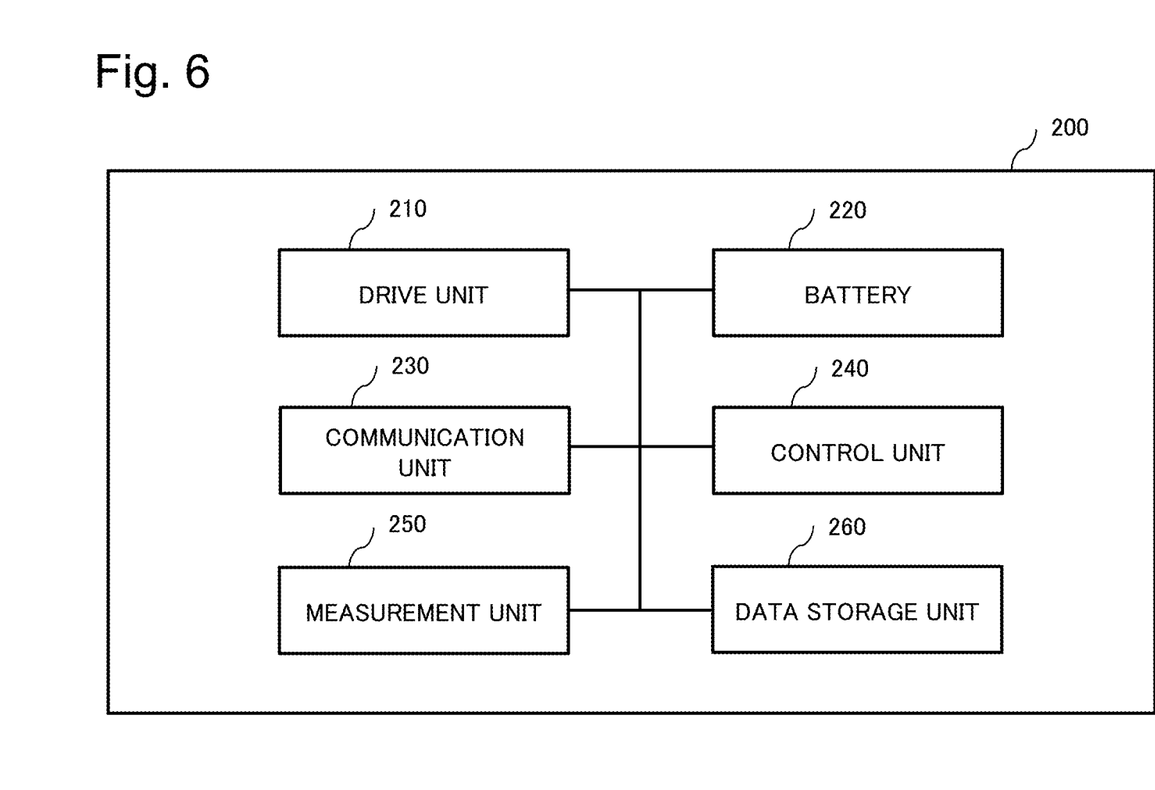
FIG. 6 is a block diagram illustrating an example of a configuration of an inspection robot according to the first example embodiment.

Next, a configuration of the inspection robot 200 will be described. FIG. 6 is a block diagram illustrating an example of the configuration of the inspection robot 200 according to the first example embodiment. The inspection robot 200 includes a drive unit 210, a battery 220, a communication unit 230, a control unit 240, and a measurement unit 250.

The drive unit 210 includes a drive device that moves the inspection robot 200. The drive device varies depending on the environment (in the air, on the ground, underwater, and the like) in which the inspection robot executes inspection. For example, one example of the drive device in the air is a motor device connected to a rotor blade.

The battery 220 is a power source for operating each functional block of the inspection robot 200. An example of the power source is a rechargeable battery.

The communication unit 230 transmits and receives information to and from the inspection management device 100 by wireless or wired communication. The communication unit 230 transmits a state of inspection work of the inspection robot 200 and measurement data to the inspection management device 100. Alternatively, the communication unit 230 receives an inspection plan from the inspection management device 100.

The control unit 240 controls movement of the inspection robot 200 and operation of the inspection device. The control unit 240 moves the inspection robot 200 to each measurement position of the structure on the basis of the inspection plan transmitted from the inspection management device 100.

Figure 7:
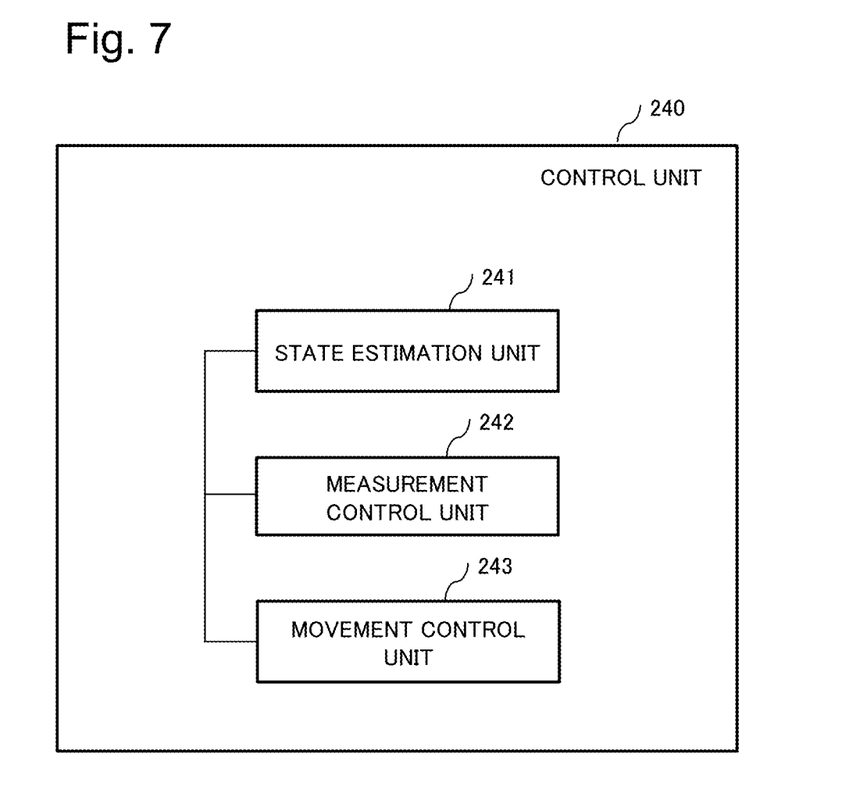
FIG. 7 is a block diagram illustrating an example of a configuration of a control unit of the inspection robot.

FIG. 7 is a block diagram illustrating an example of a configuration of the control unit 240 of the inspection robot 200. The control unit 240 includes a state estimation unit 241, a measurement control unit 242, and a movement control unit 243.

The state estimation unit 241 estimates a state of the inspection robot 200 including a position, a moving speed, an attitude, or a remaining battery level of the inspection robot 200. For example, the position and the moving speed of the inspection robot 200 can be acquired by a positioning technique based on a global positioning system (GPS) signal or acceleration by the acceleration sensor.

As the inspection robot 200 moves under the bridge, a reception level of the GPS signal may be lowered, and accuracy in detection of the position of the inspection robot 200 may be lowered. At this time, the state estimation unit 241 may estimate the position of the inspection robot 200 by using a self localization technique. An example of the self localization technique is visual odometry that estimates the position and the attitude of the inspection robot 200 from a camera image and inertial measurement unit (IMU) information.

The measurement control unit 242 controls the hammering inspection machine of the measurement unit 250 in accordance with measurement conditions calculated by the measurement planning unit 121. The movement control unit 243 controls rotation of the rotor blade of the drive unit 210 so that the inspection robot 200 moves along an inspection route calculated by the route planning unit 122.

The measurement unit 250 at least includes the inspection device for inspecting the structure. An example of the inspection device is the hammering inspection machine. The hammering inspection machine includes the hammer that hammers the surface of the structure, and a hammering sensor that measures hammering sound from the structure and outputs measurement data. Examples of the measurement data include a frequency of hammering sound or a sound pressure (amplitude) of hammering sound. A GPS receiver that detects the position of the inspection robot 200 may be provided in the measurement unit 250. A digital camera mounted on the inspection robot 200 outputs a captured image of the surroundings of the inspection robot 200. The surrounding image of the inspection robot 200 is used, for example, to confirm a movement status of the inspection robot 200 to the bridge or to confirm measurement positions. Alternatively, the inspection robot 200 may take a picture of the structure at each measurement position with the digital camera and link the picture with the measurement data.

Figure 8:
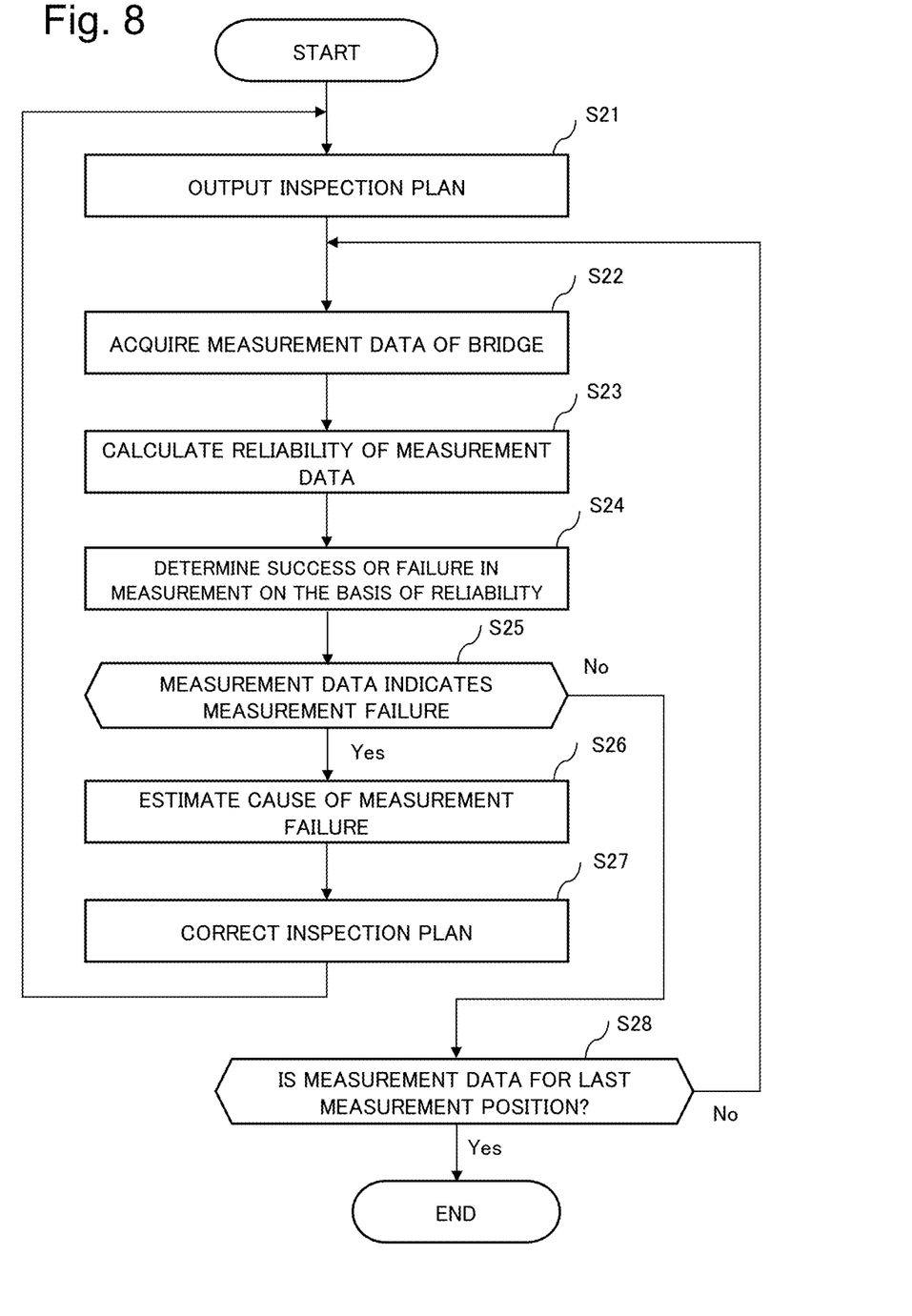
FIG. 8 is a flowchart illustrating an example of operation of the inspection management device according to the first example embodiment.

Next, operation of the inspection management device 100 and the inspection robot 200 according to the first example embodiment will be described with reference to the drawings. FIG. 8 is a flowchart illustrating an example of the operation of the inspection management device 100 according to the first example embodiment.

The inspection planning unit 120 generates an initial inspection plan before inspection of the bridge starts. The inspection planning unit 120 outputs the inspection plan to the inspection robot 200 (Step S21).

The data analysis unit 110 acquires measurement data measured at measurement positions of the bridge by the inspection robot 200 (Step S22). The inspection robot 200 outputs measurement data each time when the inspection robot 200 performs measurement of each measurement position.

The measurement determination unit 111 of the data analysis unit 110 generates reliability of the acquired measurement data (Step S23). The measurement determination unit 111 determines success or failure in the measurement on the basis of the reliability of the measurement data (Step S24).

When the measurement data indicates measurement failure (Yes in Step S25), the cause estimation unit 112 estimates a cause of the measurement failure (Step S26).

The inspection planning unit 120 corrects the inspection plan based on the cause estimated by the cause estimation unit 112 (Step S27). The inspection planning unit 120 outputs the corrected inspection plan to the inspection robot 200.

On the other hand, when the measurement data indicates measurement success (No in Step S25) and the measurement data is for the last measurement position (Yes in Step S28), the data analysis unit 110 finishes the inspection. When the measurement data is not for the last measurement position (No in Step S28), the data analysis unit 110 acquires measurement data at the next measurement position (Step S22).

Figure 9:
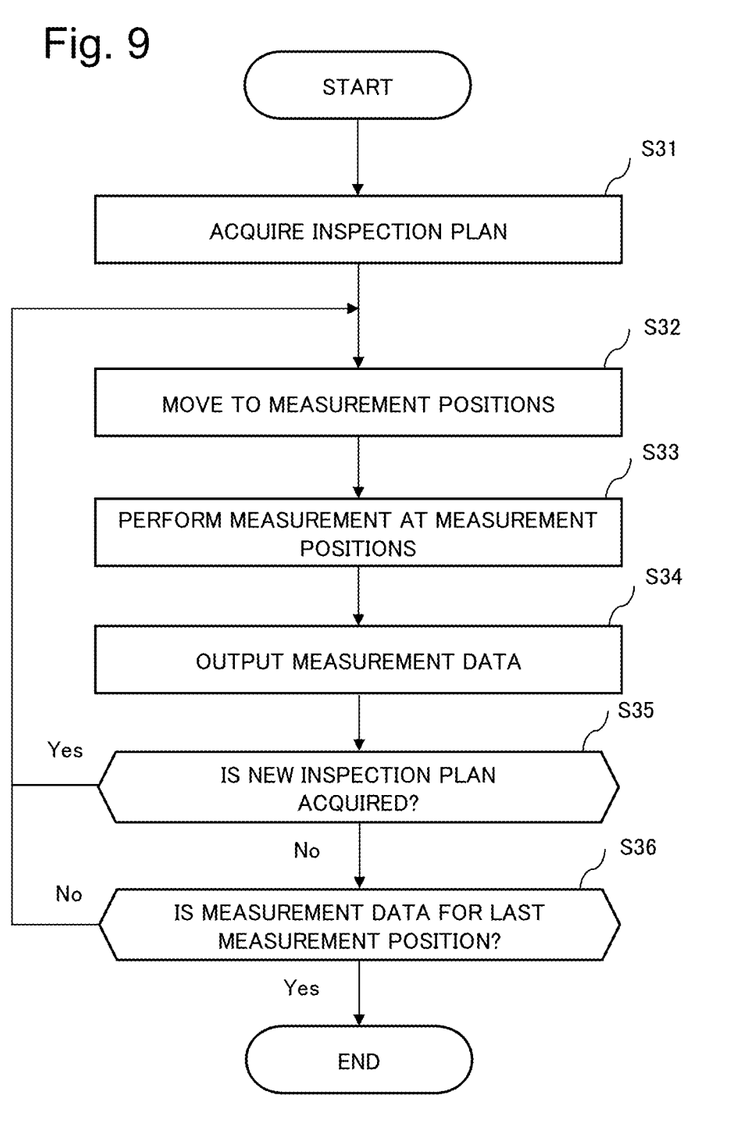
FIG. 9 is a flowchart illustrating an example of operation of the inspection robot according to the first example embodiment.

Next, the operation of the inspection robot 200 according to the first example embodiment will be described with reference to the drawings. FIG. 9 is a flowchart illustrating an example of the operation of the inspection robot 200 according to the first example embodiment.

The control unit 240 of the inspection robot 200 acquires an inspection plan (Step S31). The movement control unit 243 and the state estimation unit 241 of the control unit 240 move the inspection robot 200 to measurement positions included in the inspection plan (Step S32).

The measurement control unit 242 instructs the measurement unit 250 to perform measurement at the measurement positions in accordance with the inspection plan. The measurement unit 250 measures the measurement position with the inspection device and outputs measurement data (Step S34).

The control unit 240 stands by for a predetermined time until acquiring a new inspection plan from the inspection management device 100. When the new inspection plan is acquired within the predetermined time (Yes in Step S35), the control unit 240 moves the inspection robot 200 to measurement positions in accordance with the new inspection plan.

When the new inspection plan is not acquired within the predetermined time (No in Step S35), the control unit 240 confirms whether the output measurement data is for the last measurement position. When the output measurement data is for the last measurement position (Step S36), the control unit 240 finishes the inspection of the bridge. When the output measurement data is not for the last measurement position (No in Step S36), the control unit 240 moves the inspection robot 200 to the next measurement position to continue the inspection of the bridge.

(Effects of First Example Embodiment)

The inspection management device 100 according to the first example embodiment acquires measurement data from the inspection robot 200 each time measurement is performed, and determines success or failure in the measurement on the basis of the measurement data. Since an inspection plan is corrected when determination of measurement failure is made, the inspection planning unit 120 can reduce the number of pieces of measurement data indicating measurement failure. With this arrangement, efficiency of the inspection work of the structure by the inspection robot 200 can be improved, and an inspection cost can be reduced.

The cause estimation unit 112 estimates a cause of measurement failure and the inspection plan is corrected on the basis of the estimated cause. With this arrangement, by performing measurement again with measurement parameters different from those at the time of the measurement failure, similar measurement failure can be prevented. Furthermore, by changing the measurement parameters on the basis of the cause of the measurement failure, similar measurement failure at the time of performing measurement again can be avoided.

(Modification)

Although the first example embodiment has been described by using an example of inspection of a bridge, a structure to be inspected is not limited to a bridge. For example, a structure such as a building or a tunnel may be used.

Although the first example embodiment has been described by using an example of a hammering inspection as content of the inspection of the bridge, another inspection system may be used. Another inspection system such as 3D model generation of a structure with a camera is also applicable. As an alternative to close visual inspection by a person, for example, an inspection system may be applied in which an image of the surface of a bridge is captured by the camera mounted on the inspection robot 200 and the captured image is analyzed to determine damage in the bridge from a state of a crack on the surface, or the like.

Although the description has been made by using an example of an unmanned flying object as the inspection robot, another type of robot such as a ground-running robot, a water surface mobile robot, or an underwater mobile robot may be used.

One of the functions of the data analysis unit 110 and the inspection planning unit 120 included in the inspection management device 100 may be mounted on the inspection robot 200.

A part of the state estimation unit 241 may be on a calculator mounted on the inspection robot 200 or may be mounted on the inspection management device 100 instead of the inspection robot 200.

(Hardware Configuration)

Figure 10:
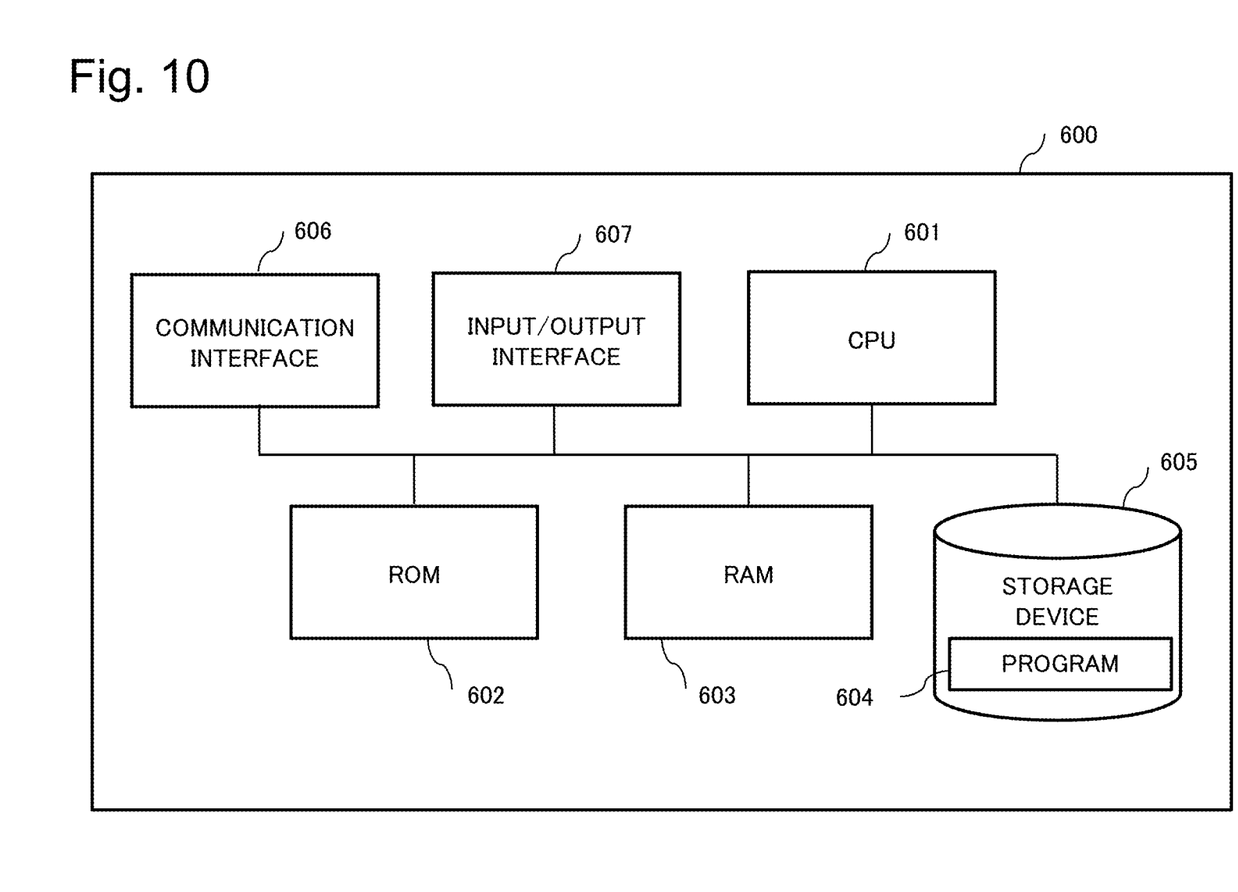
FIG. 10 is a block diagram illustrating a hardware configuration for implementing the inspection management device according to the first example embodiment on a computer.

FIG. 10 is a block diagram illustrating a hardware configuration for implementing the inspection management device 100 according to the first example embodiment on a computer.

In the first example embodiment, each configuration of the inspection management device 100 indicates a block of a functional unit. A part or all of the configurations is implemented, for example, by any combination of a computer 600 and a program illustrated in FIG. 10. The computer 600 includes, as an example, the following configurations.

A central processing unit (CPU) 601,
a read only memory (ROM) 602,
a random access memory (RAM) 603,
a program 604 loaded into the RAM 603,
a storage device 605 that stores the program 604;
a communication interface 606, and
an input/output interface 607 that inputs/outputs data, Each of the configurations of the inspection management device 100 is implemented by the CPU 601 acquiring and executing the program 604 that implements functions of the configurations. The program 604 that implements the functions of the configurations is, for example, stored in advance in the storage device 605 or the RAM 603, and read by the CPU 601 as necessary.

There are various modifications of the method of implementing the inspection management device 100. For example, the inspection management device 100 may be implemented by any combination of a computer and a program that are separate from each other in each configuration.

A part or all of the configurations of the inspection management device is implemented by another general-purpose or exclusive circuit, a processor, or the like, or a combination thereof. These may include a single chip or a plurality of chips connected via a bus. A programmable logic device such as a field-programmable gate array (FPGA) may also be used instead of a computer.

In addition, a part or all of the configurations of the inspection management device 100 may be implemented by a combination of the above-described circuit or the like and a program.

When a part or all of the configurations of the inspection management device 100 is implemented by a plurality of computers, circuits, and the like, the plurality of computers, circuits, and the like may be arranged in a centralized manner or in a distributed manner. For example, the computers, the circuits, and the like may be implemented in a form in which each client and server, cloud computing, or so on are connected via a communication network.

The present invention has been described above by using the above-described example embodiments as model examples. However, the present invention is not limited to the above-described example embodiments. That is, the present invention can apply various aspects that will be understood by those of ordinary skill in the art within the scope of the present invention as defined by the claims.

REFERENCE SIGNS LIST 100 inspection management device
110 data analysis unit
111 measurement determination unit
112 cause estimation unit
120 inspection planning unit
130 data storage unit
140 communication unit
150 input unit
160 output unit
200 inspection robot
220 battery
230 communication unit
240 control unit
241 state estimation unit
242 measurement control unit
243 movement control unit
250 measurement unit
260 data storage unit

What is claimed is:

1. An inspection management device comprising one or more memories storing instructions and one or more processors configured to execute the instructions to:
acquire measurement data output from an inspection robot that inspects a structure in accordance with an inspection plan, the measurement data acquired each of a plurality of times that the inspection robot performs the measurement;
generate a model of measurement data reliability by using, as learning data, past measurement data including acoustic waveforms or photographed images measured by the inspection robot when the structure or a similar structure was previously inspected, differences between successful measurements and failed measurements of the acoustic waveforms or the captured images for the past measurement data, and abnormality determination results of the structure based on the past measurement data;
generate a reliability of the acquired measurement data by using the generated model;
determine success or failure in measurement at a measurement position of the structure based on the acquired measurement data by comparing the generated reliability with a predetermined threshold value;
estimate a cause of measurement failure based on the success or the failure in the measurement each of the plurality of times that the inspection robot performed the measurement;
correct the inspection plan based on the estimated cause of measurement failure; and
cause the inspection robot to again inspect the structure in accordance with the corrected inspection plan.

2. The inspection management device according to claim 1, wherein
the one or more processors are configured to execute the instructions to further:
set, based on the estimated cause, a measurement parameter when the inspection plan is corrected, and
set an inspection route for the inspection robot.

3. The inspection management device according to claim 1, wherein
the one or more processors are configured to execute the instructions to further change an inspection route when the inspection robot deviates from the inspection route included in the inspection plan or when an obstacle is detected on the inspection route.

4. The inspection management device according to claim 1, wherein
the one or more processors are configured to execute the instructions to further:
when the success in the measurement at the measurement position of the structure has been determined, determine, based on the acquired measurement data, whether an abnormality is present in the structure at the measurement position,
wherein when the abnormality in the structure has been determined as being present, the inspection plan is corrected in such a way that a periphery of the measurement position determined to have the abnormality is measured again.

5. An inspection management method comprising:
acquiring, by a processor, measurement data output from an inspection robot that inspects a structure in accordance with an inspection plan, the measurement data acquired each of a plurality of times that the inspection robot performs the measurement;
generating, by the processor, a model of measurement data reliability by using, as learning data, past measurement data including acoustic waveforms or photographed images measured by the inspection robot when the structure or a similar structure was previously inspected, differences between successful measurements and failed measurements of the acoustic waveforms or the captured images for the past measurement data, and abnormality determination results of the structure based on the past measurement data;
generating, by the processor, a reliability of the acquired measurement data by using the generated model;
determining, by the processor, success or failure in measurement at a measurement position of the structure based on the acquired measurement data by comparing the generated reliability with a predetermined threshold value;
estimating, by the processor, a cause of measurement failure based on the success or the failure in the measurement each of the plurality of times that the inspection robot performed the measurement;
correcting, by the processor, the inspection plan based on the estimated cause of measurement failure; and
causing, by the processor, the inspection robot to again inspect the structure in accordance with the corrected inspection plan.

6. A non-transitory recording medium storing a program executable by a computer to perform:
acquiring measurement data output from an inspection robot that inspects a structure in accordance with an inspection plan, the measurement data acquired each of a plurality of times that the inspection robot performs the measurement;

generating a model of measurement data reliability by using, as learning data, past measurement data including acoustic waveforms or photographed images measured by the inspection robot when the structure or a similar structure was previously inspected, differences between successful measurements and failed measurements of the acoustic waveforms or the captured images for the past measurement data, and abnormality determination results of the structure based on the past measurement data;

generating a reliability of the acquired measurement data by using the generated model;

determining success or failure in measurement at a measurement position of the structure based on the acquired measurement data by comparing the generated reliability with a predetermined threshold value;

estimating a cause of measurement failure based on the success or the failure in the measurement each of the plurality of times that the inspection robot performed the measurement;

correcting the inspection plan based on the estimated cause of measurement failure; and causing the inspection robot to again inspect the structure in accordance with the corrected inspection plan.

* * * * *